July 29, 1924.
J. F. GAIL
1,503,315
ELECTRIC WELDING
Filed April 28, 1919
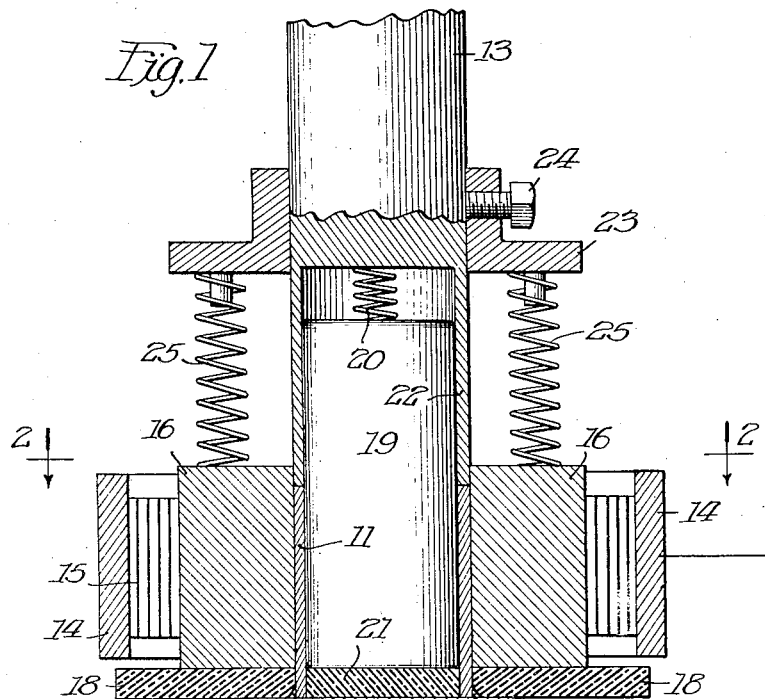
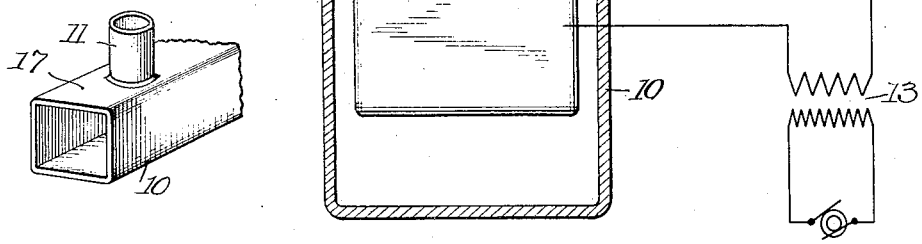
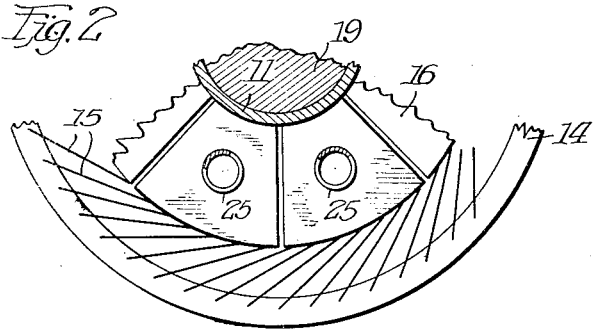
Witness:
L. W. Novander.
Inventor:
John F. Gail,
By Offield Towle Graves & Soans
Attys.

Patented July 29, 1924.

1,503,315

UNITED STATES PATENT OFFICE.

JOHN F. GAIL, OF EVANSTON, ILLINOIS, ASSIGNOR TO SIMMONS COMPANY, OF KENOSHA, WISCONSIN, A CORPORATION OF DELAWARE.

ELECTRIC WELDING.

Application filed April 28, 1919. Serial No. 293,092.

*To all whom it may concern:*

Be it known that I, JOHN F. GAIL, a citizen of the United States, residing in the city of Evanston, county of Cook, and State of Illinois, have invented certain new and useful Improvements in Electric Welding, of which the following is a specification.

My invention relates to improvements in electric welding and has particular reference to the welding together of two metal parts by a process analogous to that which is termed in the welding part "butt-welding."

In butt-welding, or analogous methods of welding as heretofore practiced, so far as I am aware, no attempt has been made to control the flow of metal at the weld. hence, welds according to the old practice have been permitted to develop uncontrolled in a more or less however hap-hazard manner during the actual operation of welding, resulting in the formation of welds which, besides being more or less ragged and unsightly, have been non-uniform in strength and frequently defective.

The principal objects of the present invention are to provide greater strength in the completed weld; to provide greater uniformity and to prevent the occurrence of defective welds; to provide a weld, the cross sectional area of which shall be greater, and the strength of the same correspondingly greater than has heretofore been possible; to produce a weld of definite predetermined cross section or contour thereby enhancing the appearance of the joint and improving the efficiency of the weld; to provide an improved method, and improved apparatus for carrying out the above stated objects, and in general, to provide an improved electric welding construction, process and apparatus of the character and for the purposes stated.

In the drawings which illustrate one application of my invention, Fig. 1 is a cross section showing the production of a weld between a nipple and a section of square tube;

Fig. 2 is a fragmentary plan view of certain parts shown in Fig. 1 and taken on the line 2—2 thereof; and Fig. 3 is a perspective view showing the completed joint or weld.

Referring to the drawings, 10 represents a light steel tube of square cross section to which is to be welded a short section 11 of light steel tube of circular cross section, the object in the present instance being to weld the end of part 11 to the outer surface or side of the tube 10.

The apparatus shown represents somewhat diagrammatically as to certain of its details, one form of apparatus by which the union of the two parts, 10 and 11, may be effected according to my invention. In said apparatus 12 represents one of the copper electrodes of suitable electric welding apparatus. Such apparatus may be any ordinary electric butt-welding machine or outfit of sufficient capacity to perform the service required. In place of the upper electrode of the butt-welding machine, I employ a steel plunger 13 which preferably is not connected to the other pole of the welding transformer 13 which supplies the welding current. Said other pole of the transformer is connected to a bus-ring 14 in the periphery of which are inserted a series of flexible copper contacting brushes or fingers 15 resiliently bearing against an inner ring-shaped conducting shoe 16, said conducting shoe is preferably sectional as shown best in Fig. 2, the interior of said ring 16 being bored out to fit the exterior of the tube section 11.

It will be understood that the lower electrode 12 is rigidly supported and is inserted in the tube 10 so that the upper wall 17 of the said tube 10 rests upon and in electric contact with the upper surface of the electrode 12. The electrode 16 is supported by the upper wall 17 of the tube 10 and is prevented from contacting therewith by means of a dam-plate 18 of insulating material which is capable of withstanding the welding heat while at the same time is a sufficient insulator to prevent passage of an appreciable amount of welding current.

The plunger 13 which, as previously stated, is carried in the upper head of the welding machine, is turned off to the same diameter as the exterior diameter of the tube section 11 and is bored out also to substantially the same exterior diameter as said tube section 11 thereby enabling it to slidably accommodate an interior plunger or core 19. Said core 19 is pressed down towards the electrode 12 by means of a small compression spring 20 interposed between the upper end of the core 19 and the end of the interior bore in the plunger 13, actual contact between the plunger 19 and the upper wall 17 of the tube 10 being prevented by means of an insulating dam-plate 21 of the necessary diameter to snugly fit the interior of the pipe section 11. Said insulating plate 21 is preferably of the same material as the insulating plate 18 previously referred to.

It will be understood that during the welding the short ferrule 11 is forced downwardly by means of the skirt 22 of the plunger 13, spring 20 keeping the insulation 21 tightly pressed against the upper wall 17 of the square tube 10. At the same time by means of a collar or flange 23 secured to the plunger 13 by a set screw 24 the insulation 18 is resiliently forced into tight fitting engagement with said wall 17, the resiliency being supplied by springs 25 interposed between the outer side of said flange 23 and the upper surface of the electrode 16.

In practicing my invention, one of the principal features is the confining of the fused metal in the weld so that it is compelled to assume a definite position or to flow into a definite constricted channel. To this end the plate 18 is made a snug sliding fit on the exterior of the nipple 11, and the inner plate or washer 21 similarly fits the interior of the nipple. In certain cases it may be desirable to prevent both inward and outward flow of the metal which is fused or softened during the welding operation. However, in the present instance, I prefer to round off slightly the lower edge of the insulating plate 18, as shown at 26 in Fig. 1, thereby providing a fillet shaped channel, or cavity, which encircles the weld or the point of union, so that the metal extruded by the pressure between the two parts will flow into and fill said cavity. Hence, instead of having a bead-like formation encircling the weld, as in the prior practice, the metal which is forced out of the weld will assume the shape of a fillet.

No special skill is needed in carrying out my invention. When the apparatus is set up and connected in the manner indicated, downward pressure is applied between the plunger 13 and the current is turned on. This causes the current to flow through the area of contact between the end of the pipe 11 and the upper wall 17 of the pipe 10 and rapidly raises the abutting surface to a fusing or softening temperature. While the current is kept turned on, the pressure between the tube and the ferrule is maintained until sufficient metal has been forced out of the joint to fill the fillet cavity, or if a fillet cavity is not employed, until the voids are filled and equilibrium is established, the current is then turned off and when the joint cools, which will be in a mere instant, the operation is completed.

It will be manifest that a fillet electric butt-weld such as I produced according to my invention, will possess features not present in welds made according to the old practice. The weld, by reason of the pressure to which the soft or fused metal, is subjected during the welding operation, will obviously be much more uniform, stronger, and in other ways much more efficient than an ordinary butt-weld, the advantages being particularly marked in the case where the end of a thin metal part is welded to a thin sheet or tube.

I attribute the success of my invention to some extent to the fact that the pressure between the electrodes is supported by the hydrostatic pressure produced in the more or less fluid metal, whereas, in the old practice the pressure is supported by the butting together of the more solid portions of the members which are being welded.

It will be understood that the weld fillet need not necessarily be of the size, shape, or contour indicated. In several cases it may be desirable to have no fillet at all either on the inside or the outside of the weld, in other cases, the weld fillet may be wholly on the inside of the joint or, by using a suitable mold, and extending the duration of the welding operation, sufficient metal may be forced out of the joint to form an ornamental bead of any desired shape encircling the joint or union.

The scope of the invention should be determined by reference to the appended claims, the latter being interpreted as broadly as possible consistent with the state of the art.

I claim:

1. In an apparatus for welding two parts together, the combination of means for forcing the two parts together and maintaining welding current therebetween so as to melt the metal at the juncture line, a mold adapted to receive and form the extruded metal so as to provide a reinforcement extending along the juncture line of the two parts, and means for holding the mold against relative movement with respect to one of said parts.

2. In an apparatus for welding two parts together, the combination of means for forcing the two parts together and maintaining welding current so as to melt the metal at the juncture line, a mold loosely engaging one of the parts and adapted to receive and form the extruded metal so as to provide a reinforcement extending along the juncture line of the two parts, and means for clamping the mold on to the other of said parts to prevent relative movement and to form the reinforcement in a predetermined position with respect to said part.

3. In an apparatus for welding two parts together, the combination of means for forcing the two parts together and maintaining welding current therebetween, a mold forming a pocket along the juncture line of the two parts for receiving the extruded metal and forming a reinforcement connecting the two parts, said mold having a differential engagement with the two parts so as to permit relative movement between the mold and one of the parts and prevent corresponding relative movement between the mold and the other of said parts.

4. In an apparatus for welding a tube endwise against the face of a plate, the combination of insulating means adapted to be secured against the face of the plate and to have the tube inserted therethrough so as to butt endwise against the face of the plate, said insulating means being provided with a cavity extending along the line of contact of the plate and tube and forming with the walls of the plate and tube a mold for extruded metal, means for maintaining welding current between the tube and plate so as to melt the metal at the juncture line, and means for forcing the tube and plate together, so as to force the molten metal into the mold and form a reinforcement therein under pressure, connecting the walls of the tube and plate at opposite sides of the juncture line.

5. In an apparatus for welding a tube endwise to the face of a plate, the combination of a shoe adapted to support the plate, means for forcing the tube endwise against the plate when the latter is supported upon the shoe, insulating means clamped against the face of the plate and comprising a disk member and a ring member spaced apart to admit the end of the tube therebetween, one of said members being formed with a mold to receive extruded metal and form a reinforcement extending along the juncture line of the tube and plate, means for clamping the disk member and ring member against the plate, and means for maintaining welding current between the tube and the plate.

6. In an apparatus for welding a tube endwise to the surface of a plate, the combination of an insulator comprising a disk and a ring adapted to receive the end of the tube therebetween, a shoe, means for clamping the plate between the insulator and the shoe, a cavity in the insulator extending along the juncture line of the tube and plate, and means for simultaneously maintaining welding current between the tube and plate and simultaneously forcing them together.

7. Means for joining a tube endwise to the face of a plate, comprising a shoe and a plug adapted to clamp the plate therebetween, an expansible ring around the plug for engaging the tube therebetween, a plunger operable to slide the tube axially between the plug and ring against the plate, and means for maintaining welding current between the ring and the shoe.

8. Means for joining a tube endwise to the face of a plate, comprising a shoe, a plug having an expansible ring therearound adapted to engage the tube therebetween, an insulator co-operating with the plug and ring for clamping the plate on the shoe and having a mold cavity for forming a reinforcing along the juncture line of the tube and plate, a plunger operable to slide the tube axially between the plug and ring against the plate, and means for maintaining welding current between the ring and shoe.

JOHN F. GAIL.